United States Patent [19]

Baits

[11] Patent Number: 5,023,537
[45] Date of Patent: Jun. 11, 1991

[54] LOW FREQUENCY FEEDER FAULT PROTECTION

[75] Inventor: Paul Baits, Rockford, Ill.

[73] Assignee: Sundstrand Corporation, Rockford, Ill.

[21] Appl. No.: 397,282

[22] Filed: Aug. 23, 1989

[51] Int. Cl.$^5$ ............................................. H02P 9/30
[52] U.S. Cl. ................... 318/732; 318/798; 322/32; 322/25; 290/4 R
[58] Field of Search ................. 318/140–154, 318/778, 732; 363/43, 42, 137; 307/47, 57, 67, 68, 76, 78, 82–87; 290/4 R, 4 A, 4 B, 4 C, 6, 10, 11, 22, 23, 31, 32, 36 R, 38 R; 361/20, 21, 52, 53, 62, 63, 65, 66, 88, 93; 322/10–16, 21, 24, 25, 27, 28, 38, 39

[56] References Cited

U.S. PATENT DOCUMENTS

| 857,262 | 6/1907 | Torchio et al. | |
|---|---|---|---|
| 3,639,820 | 2/1972 | Stemmler | 318/147 |
| 4,246,531 | 1/1981 | Jordan | 322/32 X |
| 4,330,743 | 5/1982 | Glennon | 322/10 |
| 4,344,027 | 8/1982 | Karlicek | 322/32 X |
| 4,414,543 | 11/1983 | Schweitzer, Jr. | |
| 4,442,396 | 4/1984 | Hucker | 361/21 X |
| 4,446,417 | 5/1984 | Fox et al. | 322/28 X |
| 4,486,801 | 12/1984 | Jackovich et al. | 361/21 |
| 4,546,309 | 10/1985 | Kang et al. | |
| 4,567,422 | 1/1986 | Sims | 322/25 |
| 4,625,160 | 11/1986 | Hucker | 322/32 |
| 4,697,090 | 9/1987 | Baker et al. | 290/4 R |
| 4,748,337 | 5/1988 | Raad et al. | 290/31 |
| 4,777,376 | 10/1988 | Dishner | 290/4 R |
| 4,812,729 | 3/1989 | Ito et al. | 318/732 |
| 4,812,730 | 3/1989 | Nakagawa et al. | 318/732 |
| 4,830,412 | 5/1989 | Raad et al. | 290/31 |
| 4,868,406 | 9/1989 | Glennon et al. | 290/4 R |

FOREIGN PATENT DOCUMENTS 0122366 1/1984 European Pat. Off. .

Primary Examiner—Paul Ip
Attorney, Agent, or Firm—Wood, Phillips, Mason, Recktenwald & VanSanten

[57] ABSTRACT

The problem of detecting low frequency faults is solved in a VSCF control system which is operated in a start mode to start an engine (18) using a brushless synchronous generator operating as a motor (12). The motor (12) receives power through a feeder (52) from a converter (36) which is coupled through an additional feeder (44) to a source (42) of AC power. During normal, non-fault conditions, the sum of the input currents to the converter (36) and the sum of the output currents from the converter (36) must each be zero. When a fault condition exists, then one or both of these currents will be non-zero, depending upon the location of the fault. A single current sensor (56) is used to sense feeder faults by positioning the sensor to read the current through the converter input feeder (44). As long as no feeder to ground fault condition exists, then the current sensor (44) senses zero current. If a non-zero current is sensed, then it is assumed that a fault condition exists.

9 Claims, 5 Drawing Sheets

LOW FREQUENCY FEEDER FAULT PROTECTION

FIELD OF THE INVENTION

This invention relates to motor control systems and, more particularly, to a low frequency fault protection system therefor.

BACKGROUND OF THE INVENTION

Conventional electrical power systems utilize a synchronous electrical generator for generating AC power. Particularly, such a generator may include a rotor and a stator having a stator coil. In an application such as an aircraft, the rotor is driven by an engine so that electrical power is developed in the stator coil. Owing to the variation in engine speed, the frequency of the power developed in the generator windings is similarly variable. This variable frequency power is converted to constant frequency power using a variable speed constant frequency (VSCF) system including a power converter which may develop, for example, 115/200 VAC power at 400 hertz. Such known converters are controlled by a generator/converter control unit (GCCU).

In such a power system, the generator is typically connected to the converter through a feeder circuit. Similarly, the output of the converter is connected through a feeder circuit to the aircraft power bus. With known 400 hertz electric power generating systems, feeder faults are detected by measuring the current into and out of each feeder. If there is a feeder fault, either phase-to-phase or to aircraft ground, then the current into a feeder will not equal the current out of that feeder. Current transformers are most commonly used in the detection of such feeder faults. Current transformers are quite accurate when sensing high frequency AC power, such as for example, 400 hertz, so that even high impedance feeder faults can be reliably detected.

In order to provide aircraft engine starting, certain known power systems have operated the generator as a motor. Specifically, an external power source is coupled through a start control to the generator to energize the stator coil and thus develop motive power to start the engine. To minimize the size and weight of such start controls, certain known aircraft VSCF power systems have utilized the existing converter and GCCU for the start control. In such VSCF-based electric power systems, the power frequency passed between the VSCF system and the starter is zero hertz when the engine start is initiated, and gradually increases as the engine accelerates. Because current transformer inaccuracy increases as the sensed frequency decreases, the minimum feeder fault current that can be accurately detected by traditional techniques increases with decreasing current frequency. Below a minimum frequency, current transformers saturate and feeder faults will be undetected.

The present invention is intended to overcome one or more of the problems as set forth above.

SUMMARY OF THE INVENTION

In accordance with the present invention, a start control system for a motor is operable to sense low frequency feeder faults.

Broadly, there is disclosed herein a start control for a polyphase brushless machine having a rotor and a stator having a polyphase stator coil which is controllably energized from a converter which develops regulated power from a source of unregulated AC power to impart rotation of the rotor, wherein the regulated power comprises relatively low-frequency power at start up. A fault protection control includes an input feeder circuit comprising a conductor for each phase connecting the power source to the converter. An output feeder circuit comprises a conductor for each phase connecting the converter to the polyphase stator coil. A single current sensor is operatively associated with at least one of the feeder circuits and includes means for sensing low frequency current through all of the conductors associated with the one of the feeder circuits. Means are coupled to the sensing means for indicating a fault condition at start up if the current sensed by the current sensors is greater than a select minimum level.

It is a feature of the invention that the current sensor comprises a Hall effect current sensor.

It is another feature of the invention that the indicating means comprises a comparator.

It is a further feature of the invention that wherein the current sensor is operatively associated with the input feeder circuit, the indicating means indicates a fault condition from any of the input feeder circuit conductors or output feeder circuit conductors to ground.

Specifically, a VSCF control system is operated in a start mode to start an engine using a brushless synchronous generator operating as a motor. The motor receives power through a feeder from a converter which is coupled through an additional feeder to a source of AC power. During normal, i.e., non-fault, conditions, the sum of the input currents to the converter and the sum of the output currents from the converter must each be zero. If a fault condition exists, then one or both of these currents will be non-zero, depending upon the location of the fault. A single current sensor can be used to sense feeder faults by positioning the sensor to read the current through the converter input feeder. As long as no feeder to ground fault condition exists, then the current sensor senses zero current. If a non-zero current is sensed, then it is assumed that a fault condition exists.

Further features and advantages of this invention will readily be apparent from the specification and from the drawings.

DESCRIPTION OF THE INVENTION

Figure 1:
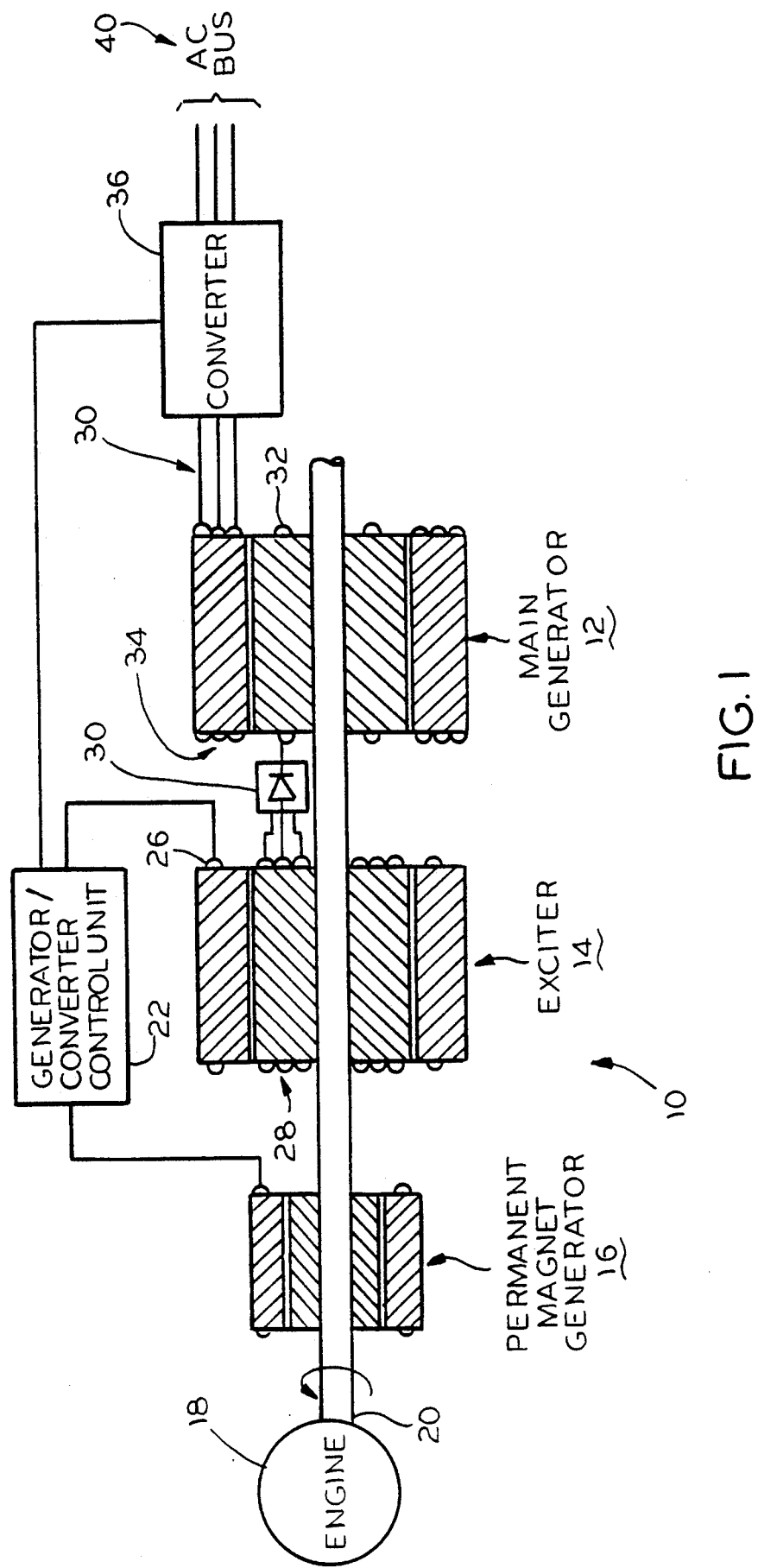
FIG. 1 a combined diagrammatic illustrationblock diagram of an electrical power system incorporating the fault protection control of the present invention.

Referring first to FIG. 1, an electrical power system 10 includes a main generator 12, an AC exciter 14 for providing main field current to the generator 12 and a permanent magnet generator (PMG) 16. Each of the main generator 12, exciter 14 and PMG 16 are driven by an engine 18 through a common shaft 20. A generator/converter control unit (GCCU) 22 receives the power developed by the PMG 16 and delivers a controlled current to a field winding 26 of the exciter 14. As is conventional in brushless power systems, rotation of the shaft 20 by the engine 18 results in generation of a polyphase voltage in armature windings 28 of the exciter 14. This polyphase voltage is rectified by a rectifier bridge, illustrated generally at 30, and the rectified power is coupled to a field winding 32 of the main generator 12. The current in the field winding 32 and the rotation of the shaft 20 sets up a rotating magnetic field in space occupied by a set of main generator stator windings 34. The stator windings 34 develop polyphase output power which is delivered to a power converter 36.

In a typical application, the engine 18 is the main engine in an aircraft, and the converter 36 is part of a variable speed constant frequency (VSCF) system as controlled by the GCCU 22 for delivering constant frequency power to an AC bus 40 for powering aircraft loads (not shown).

During engine start, the engine 18 is started using the main generator 12 operating as a motor. Particularly, the main generator 12 receives power from the converter 36 which is controlled by the GCCU 22. For ease of explanation herein, the main generator 12 is referred to as a motor when operated as such in the start mode of operation.

In order to operate in the start mode of operation, the electrical power system 10 includes a plurality of switching relays (not shown), for switching the interconnections between the converter 36 and the main generator 12. Such an arrangement is illustrated in Rozman et al., U.S. Pat. application No. 270,625, filed Nov. 14, 1988, assigned to the assignee of the present invention, the specification of which is hereby incorporated by reference herein.

Figure 2:
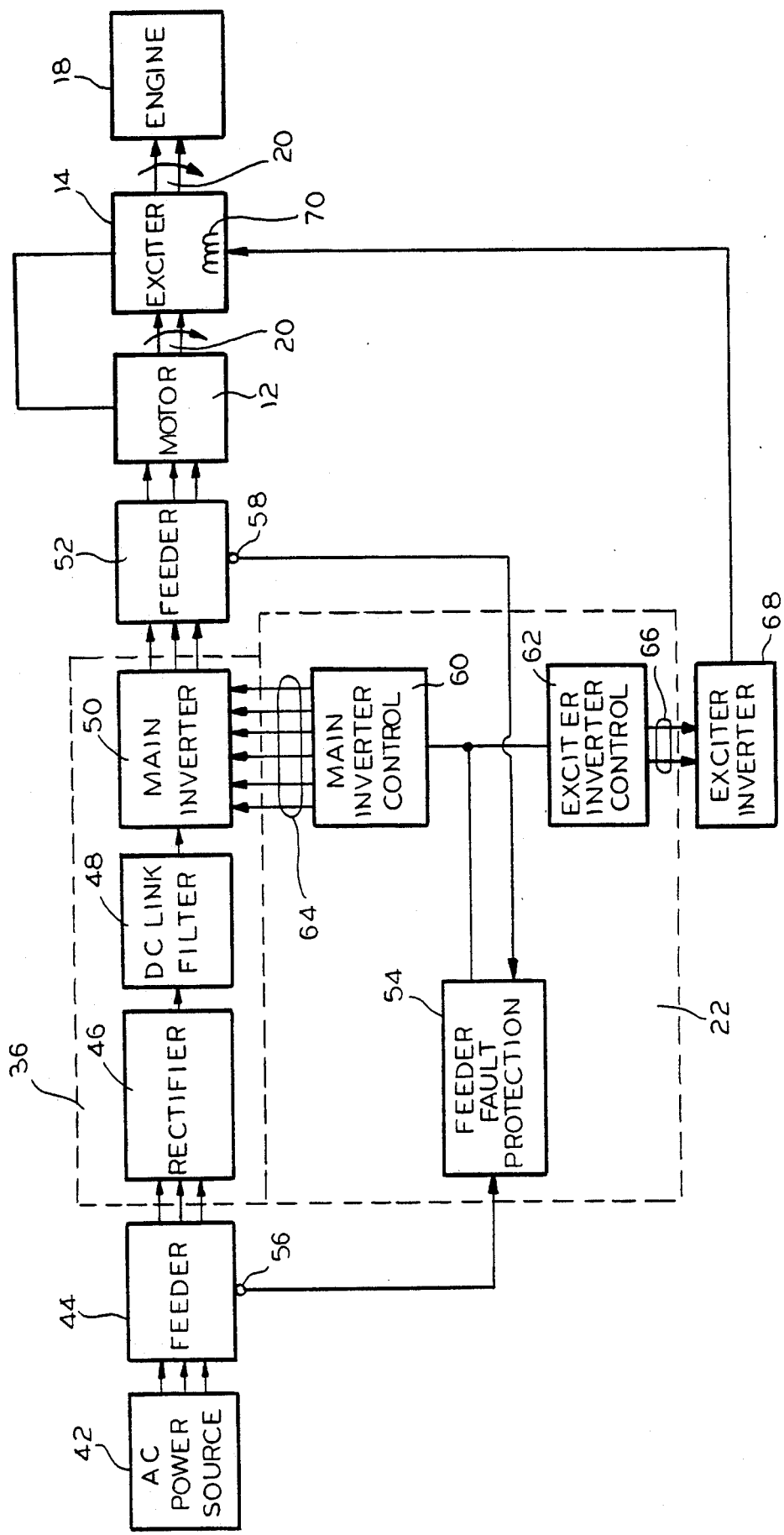
FIG. 2 is a generalized block diagram of the electrical power system of FIG. 1 illustrating the start mode of operation.

Referring now to FIG. 2, a block diagram representation more specifically illustrates the operation of the electrical power system 10 according to the invention in the start mode of operation. An AC power source 42 is coupled to an input feeder circuit 44. The AC power source 42 may be any available power source. The feeder circuit 44 comprises three conductors, one for each phase, which connect the AC power source 42 to the power converter 36. The length of the feeder conductors depend upon the configuration of the aircraft, as is well known.

The power converter 36 includes an AC/DC converter 46 connected through a DC link filter 48 to a main inverter 50. In the illustrated embodiment of the invention, the AC/DC converter 46 comprises a full wave bridge rectifier circuit of conventional construction which is operable to convert three phase AC power to DC power. The DC power is filtered in the DC link filter 48. The DC/AC converter 50 comprises a main inverter circuit, described in the co-pending Rozman et al. application incorporated by reference herein.

Three phase output power developed by the main inverter 50 is delivered through an output feeder circuit 52 to the armature windings 34, see FIG. 1, of the motor 12. The GCCU 22 includes a feeder fault protection circuit 54 which receives a current signal from an input feeder current sensor 56. Alternatively, or additionally, the feeder fault protection circuit 54 receives an output feeder current signal from an output feeder current sensor 58. The feeder fault protection circuit 54 is operable upon sensing a feeder fault to deliver a shut down signal to a main inverter control 60 and an exciter inverter control 62. The main inverter control 60 develops base drive commands on lines 64 for controlling the main inverter 50. The exciter inverter control 62 develops base drive commands on lines 66 for controlling an exciter inverter 68. Although not shown, the exciter inverter 68 may be of generally similar construction to the main inverter 50. Alternatively, other circuits may be utilized for either or both of the main inverter 50 and the exciter inverter 68, as is well known.

The exciter inverter 68 is used to develop AC start power to an AC start field winding 70 of the exciter 14. Specifically, the excitation for the wound field main generator/motor 12 cannot be supplied at zero speed by the exciter 14. Accordingly, the exciter inverter 68 and the start field winding 70 are included functioning as a rotary transformer. Specifically, AC power delivered to the exciter AC field winding 70 develops corresponding AC power in the armature windings 28 for powering the motor field winding 32, see FIG. 1.

Figure 3:
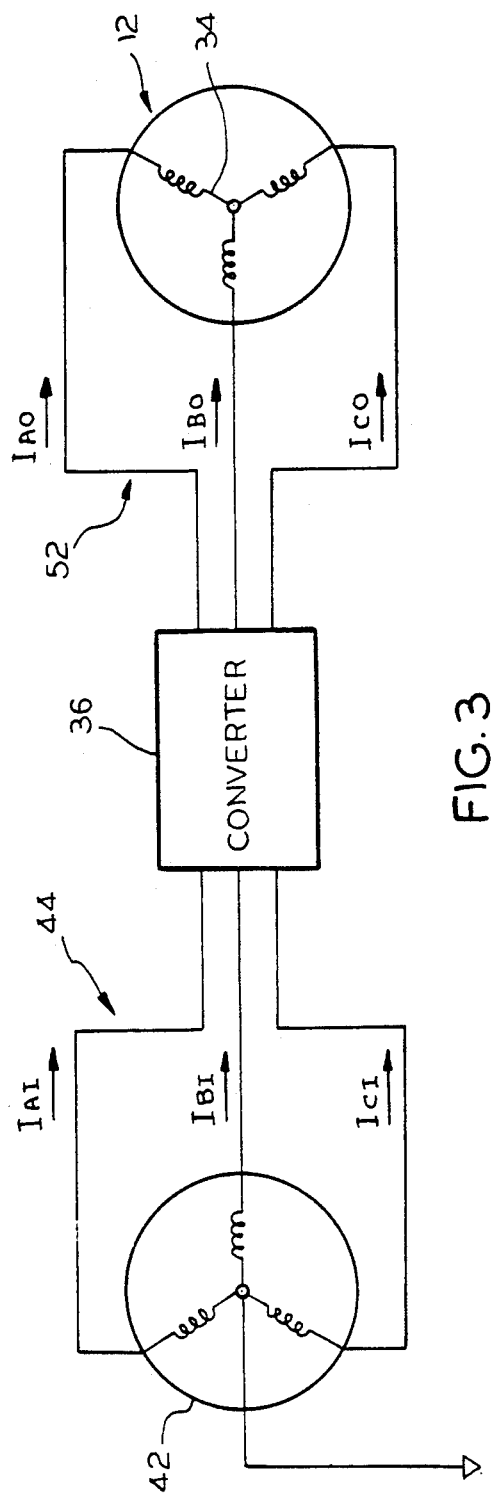
FIG. 3 is a schematic diagram illustrating operation of the start control under normal operating conditions.

Referring to FIG. 3, a schematic diagram illustrates operation of the electric power system 10, see FIG. 1, during the start mode of operation under normal operating conditions. Specifically, FIG. 3 illustrates normal current flow if there are no feeder faults into or out of the VSCF power converter 36. Because a neutral wire is not taken from the input power source 42, the sum of the input currents $I_{AI}+I_{BI}+I_{CI}$ to the input feeder conductors, and the sum of the output currents $I_{AO}+I_{BO}+I_{CO}$ through the output feeder conductors must each be zero.

Figure 4:
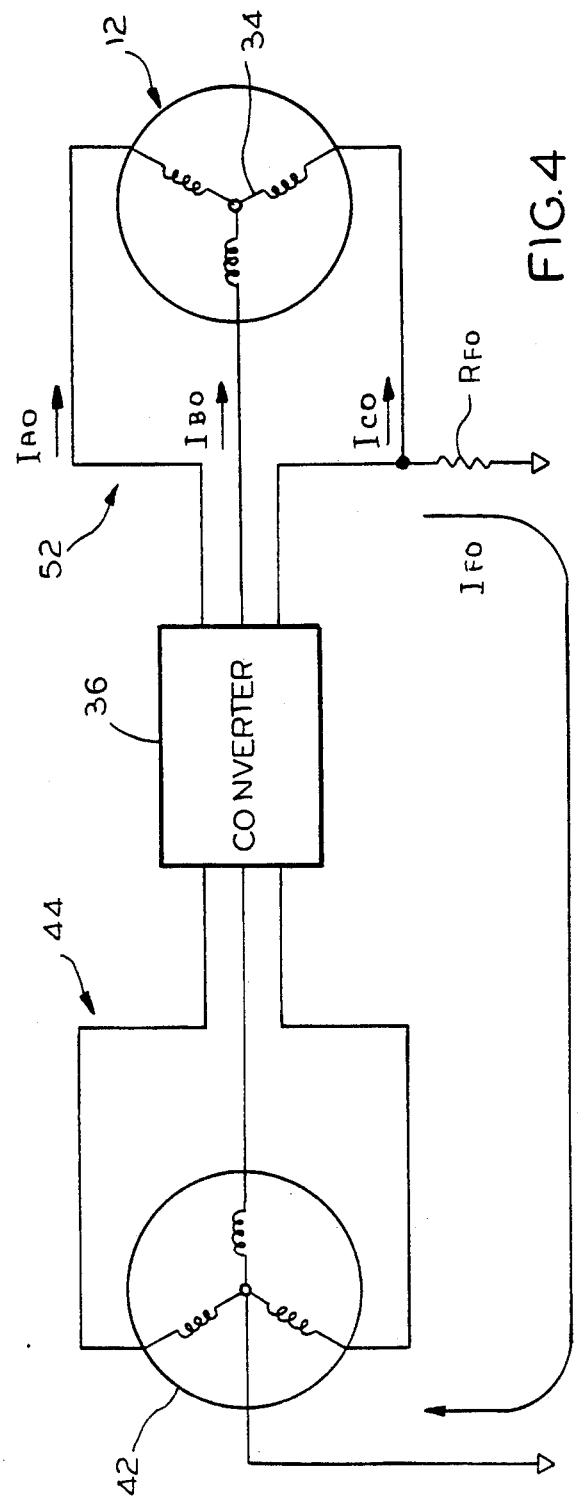
FIG. 4 a schematic diagram illustrating operation of the start control with an output feeder to ground fault.

FIG. 4 illustrates the fault current path when there is a feeder fault to ground between the power converter 36 and the motor 12. The fault is represented by a resistor $R_{FO}$ to ground. The power converter 36 supplies current to both the motor armature winding 34, represented by $I_{AO}+I_{BO}+I_{CO}$, and to the ground fault represented by the current $I_{FO}$. The fault currents return path is through the power source neutral, through the input feeder 44 and back into the converter 36.

Figure 5:
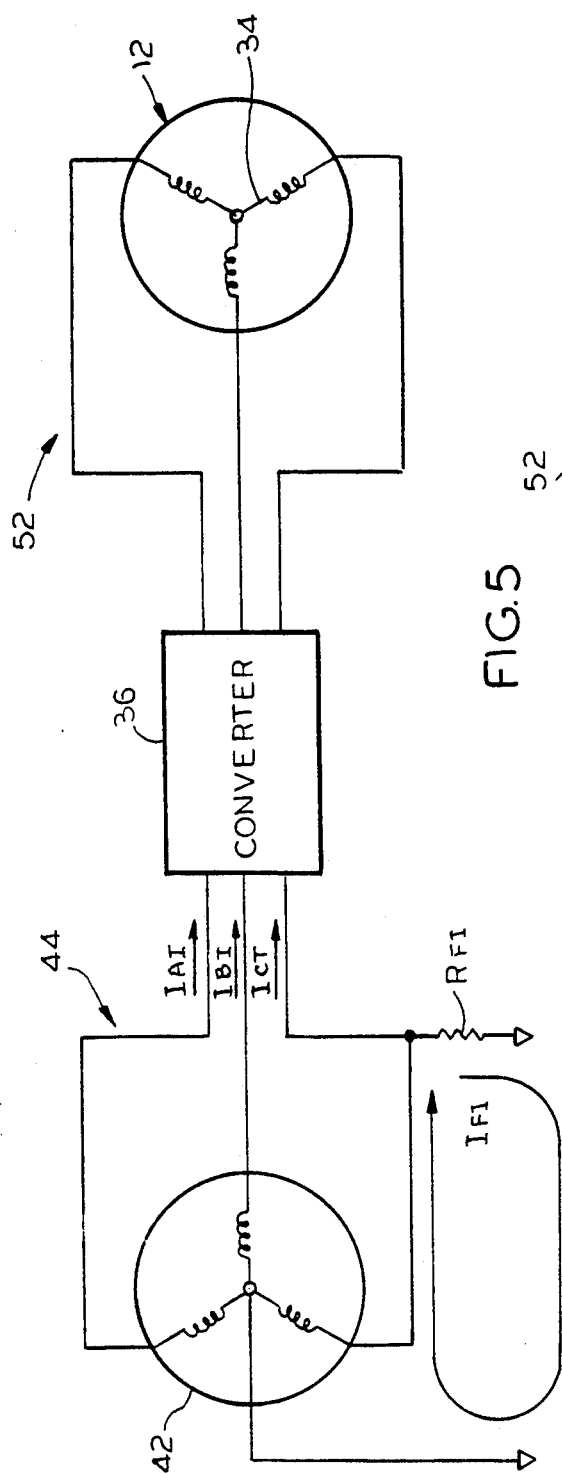
FIG. 5 is a schematic diagram illustrating operation of the start control with an input feeder to ground fault.

FIG. 5 illustrates the fault current path when there is a feeder fault to ground in the input feeder circuit 44 between the power source 42 and the power converter 36. The fault is represented by a resistor $R_{FI}$ to ground. As a result, the input power source 42 supplies current represented by the sum $I_{AI}+I_{BI}+I_{CI}$ and current to the ground fault, represented by the current $I_{FI}$. The fault currents return path is through the power source neutral and the three faults at source phase.

Figure 6:
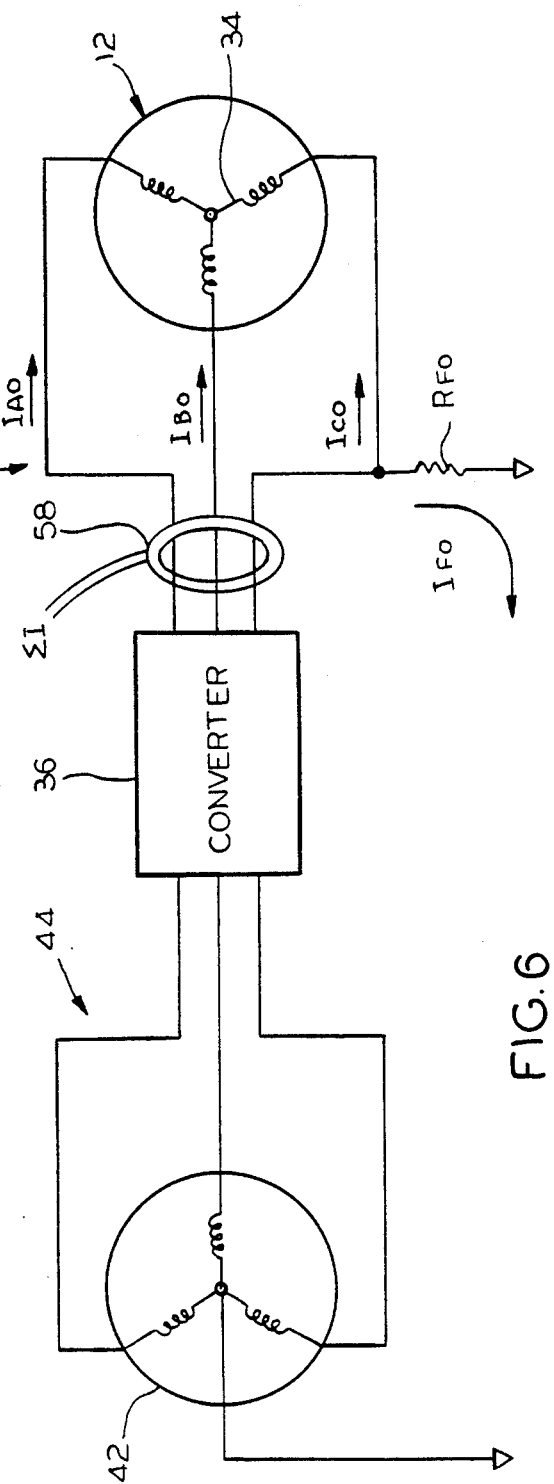
FIG. 6 is a schematic diagram illustrating operation of the start control with a single current sensor for sensing an output feeder to ground fault.

FIG. 6 illustrates a system with an output feeder ground fault, as illustrated in FIG. 4, utilizing the current sensor 58 at the output feeder circuit 52. The current sensor 58 senses the sum $I_{AO}+I_{BO}+I_{CO}+I_{FO}$. Because the sum of the currents into the motor armature winding 34 is always zero, then the current sensor reading will be $I_{FO}$. Thus, the current sensor 58 always reads zero unless there is a feeder-to-ground fault on a converter output feeder conductor.

Figure 7:
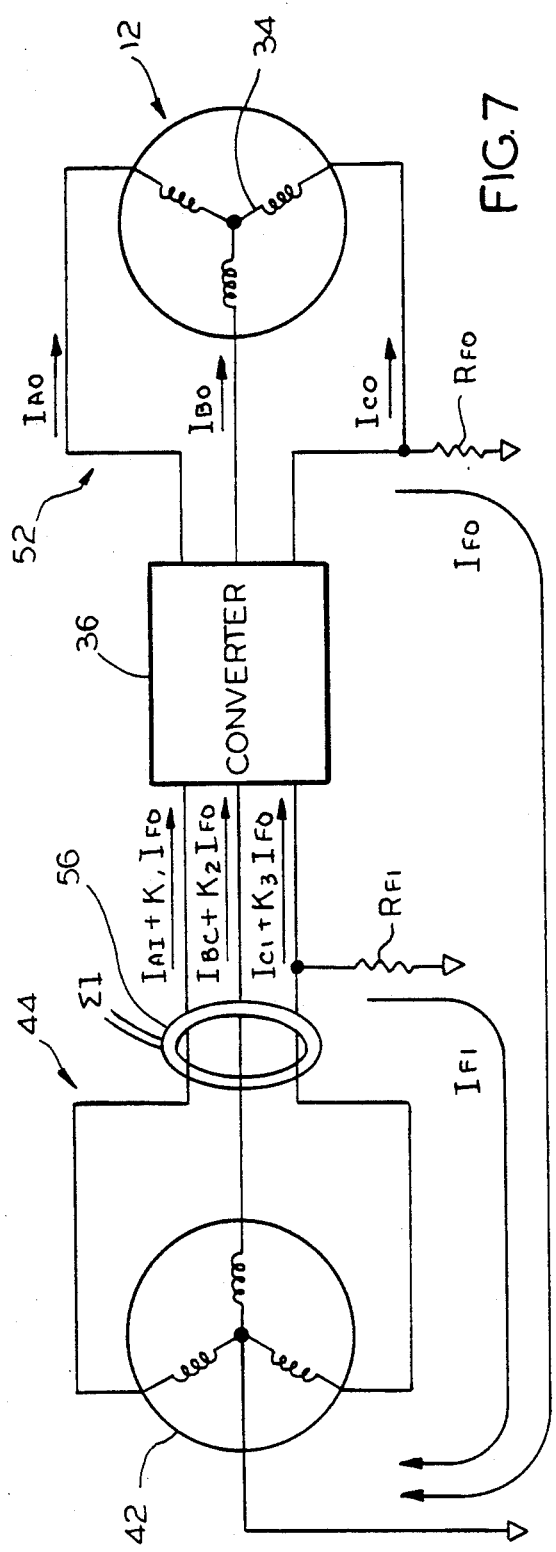
FIG. 7 is a schematic diagram illustrating operation of the start control with a single current sensor for sensing input and output feeder to ground faults.

FIG. 7 illustrates a system with both an input feeder fault, represented by the resistor $R_{FI}$, and an output feeder fault represented by the resistor $R_{FO}$ utilizing only the current sensor 56 on the input feeder circuit 44. The current sensor 56 senses the current sum $I_{AI}+I_{BI}+I_{CI}+I_{FI}+I_{FO}$. Because the sum of the unfaulted currents from the power source 42 is always zero, then the current sensor 56 senses the sum $I_{FI}+I_{FO}$. Therefore, the current sensor 56 always reads zero, unless there is a feeder-to-ground fault on either the feeder input circuit 44 or the feeder output circuit 52.

The advantage to the above-described approach for sensing faults is due to current sensor accuracy. Because Hall effect current sensors and other flight worthy DC current sensors have large temperature coefficients, their accuracies over wide temperature ranges are not good. For example, if the unfaulted current per phase is 300 amps, and the current sensors have a plus or minus 10% accuracy, and fault conditions are detected by subtracting feeder input current from feeder output current, then the fault current measurement when there is no fault would be $$(300 \text{ amps} \pm 10\%) - (300 \text{ amps} \pm 10\%) = 0 \text{ amps} \pm 60 \text{ amps}.$$

The fault protection scheme according to the invention uses a single current sensor that measures the sum of the currents. Given the same operating conditions as in the above example, then:

$$[(300 \text{ amps} - 300 \text{ amps}) \pm 10\%] = 0 \pm 10\% = 0 \text{ amps}.$$

Because the system only measures the fault current, then a much lower ground fault set point can be set than utilizing traditional techniques.

Figure 8:
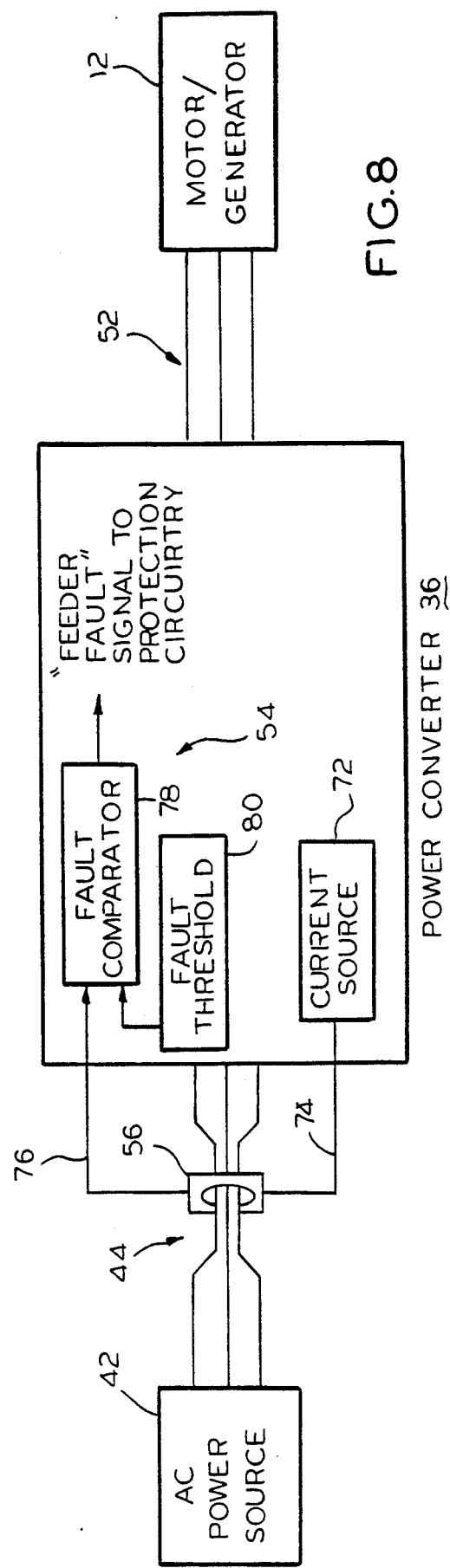
FIG. 8 is a generalized block diagram illustrating the fault control according to the invention.

Referring now to FIG. 8, a block diagram illustrates a simplified block diagram of the feeder fault protection circuit 54 shown as part of the power converter 36. In the illustrated embodiment, the current sensor 56 comprises a Hall effect current sensor. The Hall effect sensor 56 is of conventional construction, and may include a magnetic core surrounding the three conductors for the input feeder 44. A current source 72 delivers a controlled current to a winding around the core to develop a magnetic field. The output voltage from the sensor 56 is transferred on a line 76 to a fault comparator 78. The fault comparator 78 also receives a fault threshold value from a set point generator block 80. The fault comparator 78 compares the sensed current signal to the threshold value and indicates a fault condition and delivers a feeder fault signal to protection circuitry associated with the converter controls 60 and 62, see FIG. 2. The selection of the fault threshold is done according to the specific application. Theoretically, any non-zero current represents a fault condition. However, the threshold value is generally selected to be a minimum value greater than zero to allow for minor inaccuracies in sensing the current.

Upon sensing a feeder fault condition, then either of the inverter controls 60 and 62 can be operated, as necessary, or desired, to shut down operation of the motor 12.

The system described with reference to FIG. 8 can also be used to sense output feeder faults only by substituting the output current sensor 58, see FIG. 6.

Thus, the invention broadly comprehends the use of a single current sensor for sensing feeder faults into and out of a converter in a motor control system, and also to the use of a low-frequency current sensor in a motor start control system.

What is claimed is:

1. In a start control for a polyphase brushless machine having a rotor and a stator having a polyphase stator coil which is controllably energized from a converter which develops regulated power from a source of unregulated AC power to impart rotation to the rotor, wherein the regulated power comprises relatively low-frequency power at start-up, a fault protection control comprising:

an input feeder circuit comprising a conductor for each phase connecting the power source to said converter each conductor conducting low frequency current at start-up;

an output feeder circuit comprising a conductor for each phase connecting said converter to the polyphase stator coil each conductor conducting low frequency current at start-up;

a single current sensor operatively associated with all of the conductors of at least one of said feeder circuits to sense a sum of the low frequency currents through the conductors associated with the one of said feeder circuits; and means coupled to said sensing means for indicating a fault condition at start-up if the current sum sensed by said current sensor is greater than a select minimum level.

2. The fault protection control of claim 1 wherein said current sensor comprises a Hall effect current sensor.

3. The fault protection control of claim 1 wherein said indicating means comprises a comparator.

4. The fault protection control of claim 1 wherein said current sensor is operatively associated with said input feeder circuit and said indicating means indicates a fault condition from any of said input feeder circuit conductors or output feeder circuit conductors to ground.

5. A start control for a motor having a rotor and a stator having a three phase stator coil comprising:

a first feeder circuit comprising a conductor for each phase connectable to an unregulated three phase power source each conductor conducting low frequency current at start-up;

a power converter coupled to said first feeder circuit for converting the unregulated three phase power to regulated three phase power, and including means for controlling the frequency of the regulated power in accordance with rotor speed;

a second feeder circuit comprising a conductor for each phase connecting said power converter to the three phase stator coil each conductor conducting low frequency current at start-up;

a current sensor operatively associated with all of the conductors of at least one of said feeder circuits to sense a sum of the low frequency currents through the conductors associated with the one of said feeder circuits; and means coupled to said sensing means for indicating a fault condition at start-up if the current sum sensed by said current sensor is greater than a select minimum level.

6. The start control of claim 5 wherein said current sensor comprises a Hall effect current sensor.

7. The start control of claim 5 wherein said indicating means comprises a comparator for indicating if said sensed current is above a selected minimum level.

8. The start control of claim 5 wherein said current sensor is operatively associated with said first feeder circuit and said indicating means indicates a fault condition from any of said first feeder circuit conductors or said second feeder circuit conductors to ground.

9. In a converter control for a polyphase motor which is controllably energized from a source of unregulated AC power connected through plural input feeder conductors to a converter, which is connected through plural output feeder conductors to the motor, to impart rotation to the rotor, and wherein the converter develops regulated power which comprises relatively low-frequency power at start-up, and said conductors conduct low frequency current at start-up, the improvement comprising:

a single current sensor operatively associated with all of the conductors of at least one of said feeder circuits to sense a sum of the low frequency currents through the conductors associated with the one of said feeder circuits; and means coupled to said sensing means for indicating a fault condition at start-up if the current sum sensed by said current sensor is greater than a select minimum level.

* * * * *